United States Patent [19]

Christine et al.

[11] Patent Number: 4,761,197

[45] Date of Patent: Aug. 2, 1988

[54] APPARATUS FOR SEALING A WEB OF FILM

[75] Inventors: William C. Christine, Catasauqua, Pa.; Josef Schmidt; Steffen Lyons, both of Libertyville, Ill.; Brian Green, Buffalo Grove, Ill.; George J. Herschman, Bath, Pa.

[73] Assignee: Baxter Travenol Laboratories, Inc., Deerfield, Ill.

[21] Appl. No.: 889,713

[22] Filed: Jul. 28, 1986

[51] Int. Cl.⁴ .................... B32B 31/18; B32B 31/20; B32B 31/26

[52] U.S. Cl. ............................. 156/290; 156/308.4; 156/359; 156/530; 156/553; 156/581; 156/583.4; 53/555; 493/203; 493/209; 493/239

[58] Field of Search .................. 156/581, 553, 583.4, 156/530, 378, 359, 290, 308.4, 359; 53/550, 555; 493/194, 203, 206, 209, 239

[56] References Cited

U.S. PATENT DOCUMENTS

| | | | |
|---|---|---|---|
| 3,003,907 | 10/1961 | La Fleur | 156/553 |
| 3,380,646 | 4/1968 | Doyen | 493/203 |
| 3,425,185 | 1/1969 | Samways et al. | |
| 3,473,995 | 10/1969 | Schott, Jr. | |
| 3,488,914 | 1/1970 | Csernak | |
| 3,599,387 | 8/1971 | James | |
| 3,620,884 | 11/1971 | Peterson | 156/553 |
| 3,627,611 | 12/1971 | Bonk | 156/581 |
| 3,775,225 | 11/1973 | Schott, Jr. | |
| 3,830,681 | 8/1974 | Wilson | |
| 3,845,606 | 11/1974 | Wilson | |
| 3,874,976 | 4/1975 | MacFarland | 156/530 |
| 3,894,381 | 7/1975 | Christine et al. | |
| 3,925,139 | 12/1975 | Simmons | |
| 3,992,981 | 11/1976 | Stock | |
| 4,105,489 | 8/1978 | Lotto | |
| 4,221,101 | 9/1980 | Woods | |
| 4,306,400 | 12/1981 | Coleman et al. | |
| 4,378,266 | 3/1983 | Gerken | 156/359 |
| 4,387,547 | 6/1983 | Reil | |
| 4,445,960 | 5/1984 | Niklasson | 156/553 |
| 4,510,736 | 4/1985 | Muller | |
| 4,512,138 | 4/1985 | Greenawalt | |
| 4,524,567 | 6/1985 | Patelli | |
| 4,532,753 | 8/1985 | Kovacs | |

Primary Examiner—Donald E. Czaja
Assistant Examiner—J. Davis
Attorney, Agent, or Firm—Robert M. Barrett; Mary R. Jankousky; Paul C. Flattery

[57] ABSTRACT

An apparatus for sealing a web of film including a heater member for melting a portion of the film to create side and chevron seals. A back-up bar is located diametric the heater member. The heater member includes two elongated heater bars and two wing heater bars.

12 Claims, 4 Drawing Sheets

APPARATUS FOR SEALING A WEB OF FILM

BACKGROUND OF THE INVENTION

The present invention relates to an apparatus for sealing a web of film. More specifically, the present invention relates to an apparatus for creating side seals in a web of film in a form, fill and seal packaging machine.

Typically, form, fill and seal packaging machines are utilized to package a product in a flexible container. To this end, form, fill and seal packaging machines are utilized to seal pharmaceuticals, dairy products, wine, food stuffs, cosmetics and other products in flexible containers. The form, fill and seal packaging machine provides an apparatus for packaging these products in an expedient manner.

In one type of form, fill and seal packaging machine a web of heat-sealable film is passed over a former or mandrel that forms the film into a tubular shape. To effect a tubular shape, the film is folded longitudinally and heat seal along abutting longitudinal edges. The tubular shaped film is then passed around a tubular fill system that deposits the product to be packaged into the tubular shaped film. To create individual packages (hereinafter "bags") the web of film must be sealed across its width. These side seals are typically created by a sealer that creates the second seal for one bag while making the first seal for the next bag. After the side seals are created, the web of film may then be severed between the seals to create individual bags.

It is sometimes desirous to create flexible containers filled with fluids that have attached thereto fitments. As used herein the term fitments includes, without limitation, ports, valves, and other means for accessing the fluid contained within the container. The fitments provide a means for accessing the container either via a spike, needle or valve contained on the fitment. Accordingly, the delivery characteristics of the fitment are important. The delivery characteristics are especially important in the medical industry where it is critical that the exact volume of drug prescribed is infused into the patient. Moreover, economic concerns encourage better delivery characteristics. Thus, it is desirable that the delivery characteristics of the bag and fitment are optimum in order to insure that the full contents of the bag are available.

One way to improve the delivery characteristics of a flexible container is to provide the container with chevrons on its bottom portion. The chevrons function to deliver the fluid to the fitment and thereby improve the delivery characteristics of the flexible container.

The creation of flexible containers with chevrons has at times been difficult because of the fitments that are attached to the web of film. In flexible containers where chevrons have been used in the past, those containers that have been made in form, fill and seal machines typically have had the chevrons created at a separate station from the side sealing station. Also, when the web of film is utilized to create a container filled with fluid, it has been difficult to put chevrons on the web of film due to the fluid which is housed within the containers.

Another problem suffered by some prior sealing apparatus is the failure of the gripper members. Typically, the jaws of the sealing apparatus include gripper members that allow the jaws to grip the web of film. Due to the forces and stresses on these gripper members they typically have a high failure rate. Accordingly, the gripper member must be changed at frequent intervals. This can be an especially costly procedure in aseptic form, fill and seal packaging machines wherein the aseptics of the system will be violated during each change.

Thus, there is a need for an improved sealing apparatus for sealing a web of film and creating chevrons.

SUMMARY OF THE INVENTION

The present invention provides an apparatus for sealing a web of filming including on one side of the web of film a heater member for melting a portion of the web of film to create side and chevron seals in the web of film. Located on a second side of the web of film is a backup member for urging the web of film against the heater member. The heater member includes a pair of elongated bars for creating the side seals and wing bars extending from each of the elongated bars to create the chevron seals.

Preferably, the heater member includes three separate heating zones. The first wing bar being heated by the first heating zone, the second wing bar being heated by a third heating zone, and the elongated bars being heated by the second heating zone.

Accordingly, it is an advantage of the present invention to provide an apparatus for sealing a web of film that simultaneously creates side seals and chevrons in the web of film.

Another advantage of the present invention is that it provides an improved sealing apparatus for form, fill and seal packaging machines.

A further advantage of the present invention is that it provides a sealing apparatus for form, fill and seal packaging machines which creates sealed flexible containers under aseptic conditions.

Moreover, an advantage of the present invention is that the sealing apparatus includes three separate heating zones.

Furthermore, an advantage of the present invention is that the chevron seal is not created at a second station or operation.

A further advantage of the present invention is that it creates flexible containers with improved delivery characteristics.

Moreover, an advantage of the present invention is that it provides flexible containers with improved aesthetic characteristics.

Another advantage of the present invention is that it solidifies the port seating at the bag end.

Still another advantage to the present invention is that the sealing apparatus includes rubber grippers that have a substantially longer life than prior art grippers.

A still further advantage of the present invention is that the chevron seals may be created on a web of film that houses a fluid.

Moreover, an advantage of the present invention is that it creates bags that have reduced residual after draining.

Another advantage of the present invention is that the sealing apparatus is constructed so that the heat from the sealing apparatus is distributed evenly across the chevron seal.

Additional features and advantages are described in, and will be apparent from, the detailed description of the presently preferred embodiments, and from the drawings.

DETAILED DESCRIPTION OF THE PRESENTLY PREFERRED EMBODIMENTS

Figure 1:
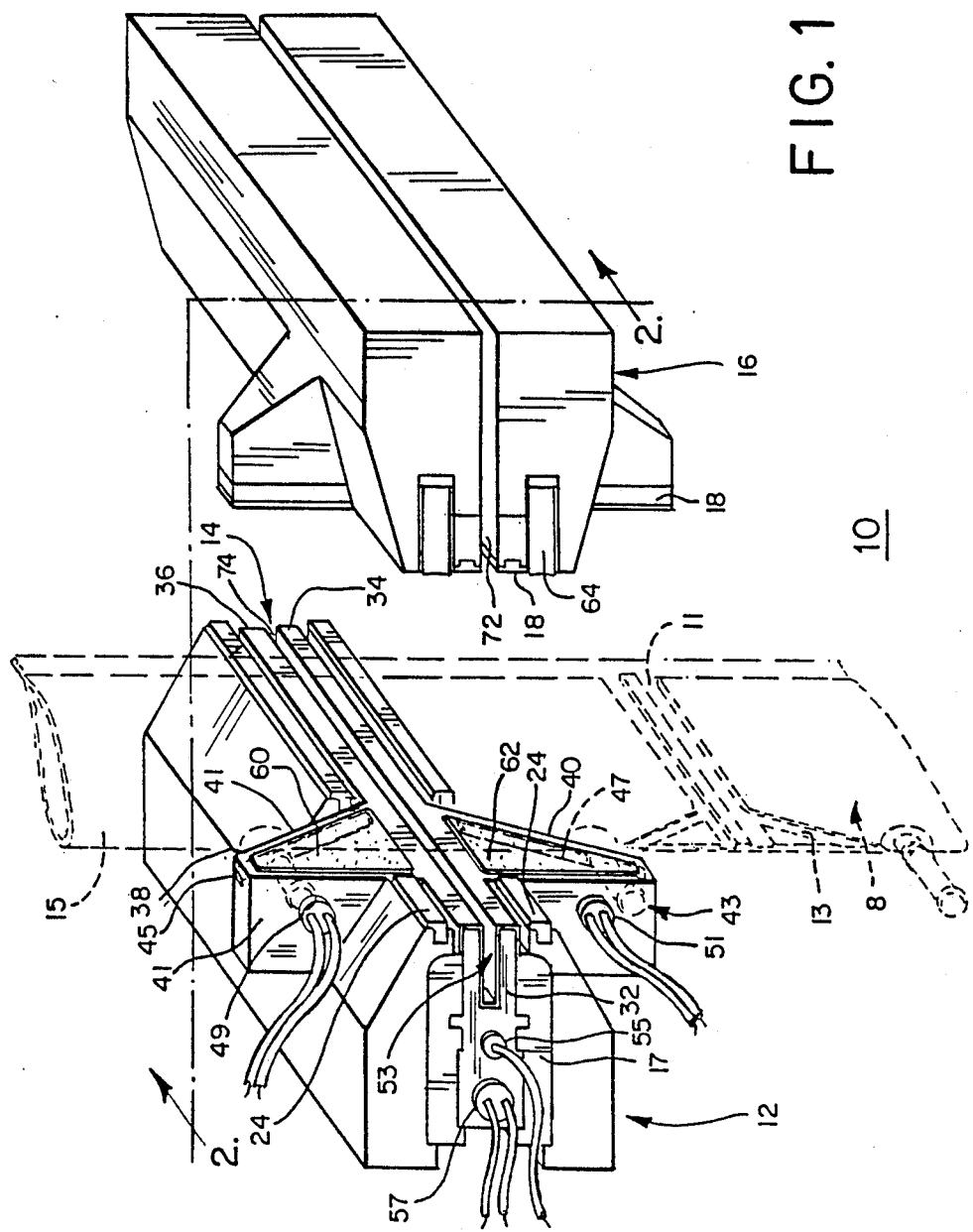
FIG. 1 illustrates a side elevational view of the sealing apparatus of the present invention with the web of film illustrated in broken lines.
Figure 3:
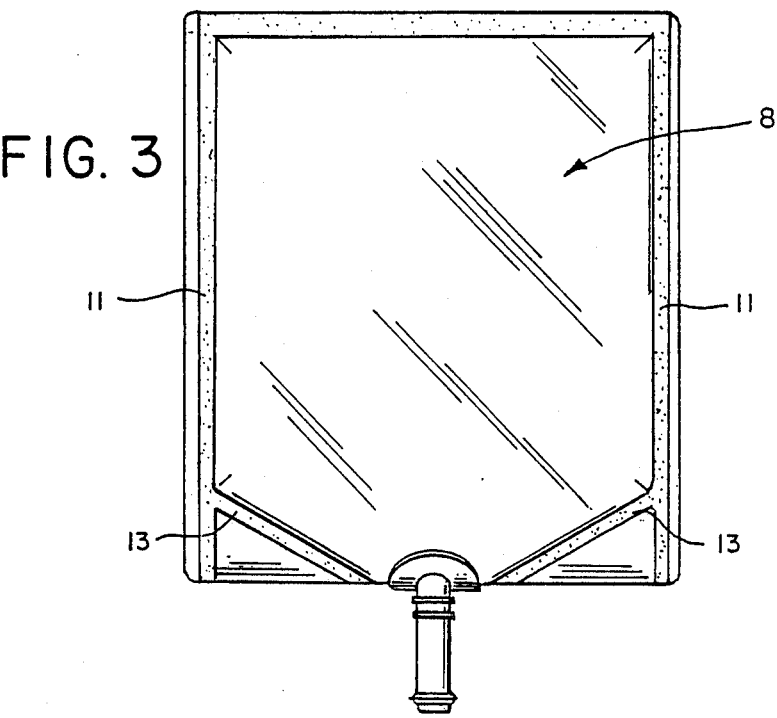
FIG. 3 illustrates a container created on the apparatus of the present invention.

Referring to FIG. 1, the sealing apparatus 10 of the present invention is illustrated. The sealing apparatus 10 is preferably designed for use in a form, fill and seal packaging machine (not shown) to create a container 8 having side seals 11 and chevron seals 13 as illustrated in FIG. 3.

As used herein "form, fill and seal packaging machine" means a machine for creating from a flexible web of film a bag for housing a product. In a typical form, fill and seal packaging machine the web of film is folded in half and the side seals are created as the web of film is sealed onto itself. Of course, the sealing apparatus 10 of the present invention can be used in other packaging machinery or with other apparatus to seal a web of film.

The sealing apparatus 10 includes a first jaw 12 that includes a heater member 14 and a second jaw 16 that includes the back-up member 18. As discussed in detail below, and as illustrated in FIG. 2, the heating member 14 functions to melt a portion of the web of film 15 so that the side seals 11 and chevron seals 13 are effectuated, and the back-up member 18 functions to urge the web of film 15 against the heating member 14.

Figure 2:
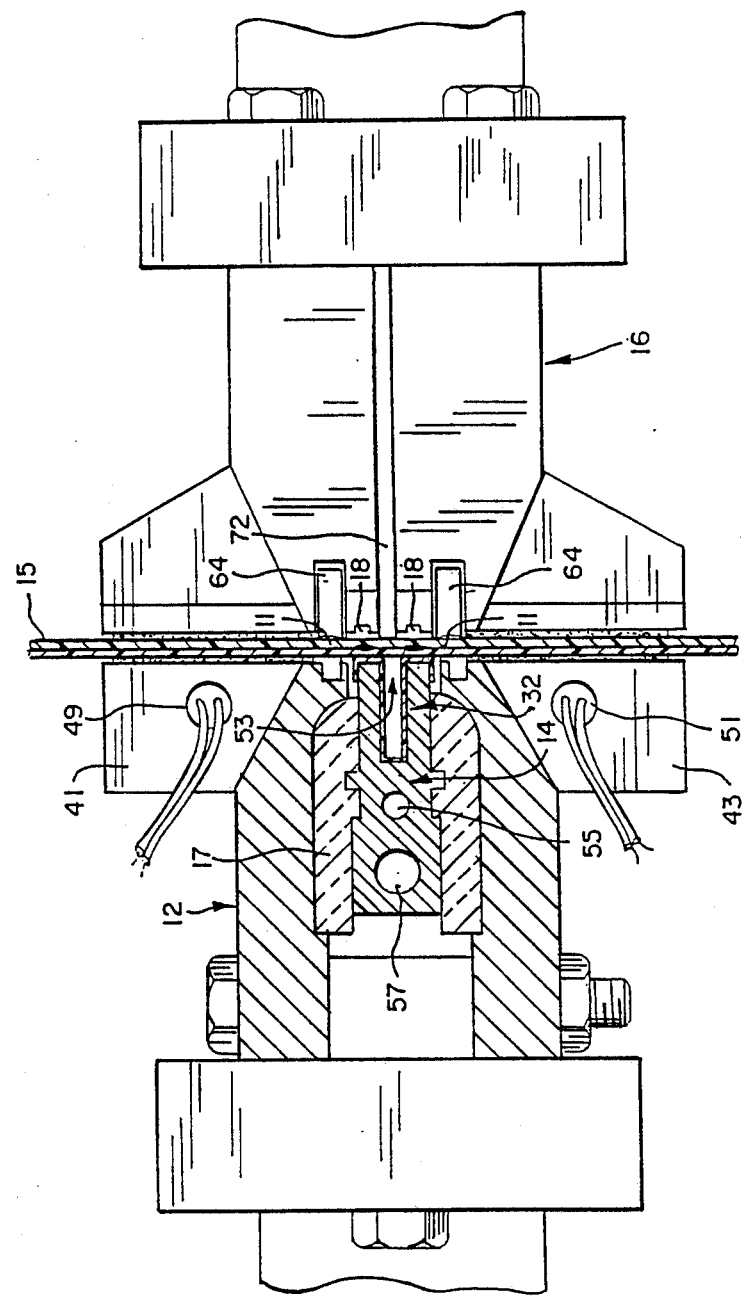
FIG. 2 illustrates a cross-sectional view of the apparatus of FIG. 1 sealing a web of film, taken along lines 2—2 of FIG. 1.

As illustrated in FIGS. 1 and 2, the first jaw 12 and second jaw 16 are located on opposite sides of the web of film 15, diametric each other, i.e., facing each other. The jaws 12 and 16 function, in part, to advance the web of film 15 through the sealing stage of the form, fill and seal packaging machine. To this end, the jaws 12 and 16 are hydraulically actuated and are simultaneously raised and lowered with respect to the web of film 15. An automatic advancement of film 15 is accomplished by intermittently closing and opening the jaws 12 and 16.

Figure 4:
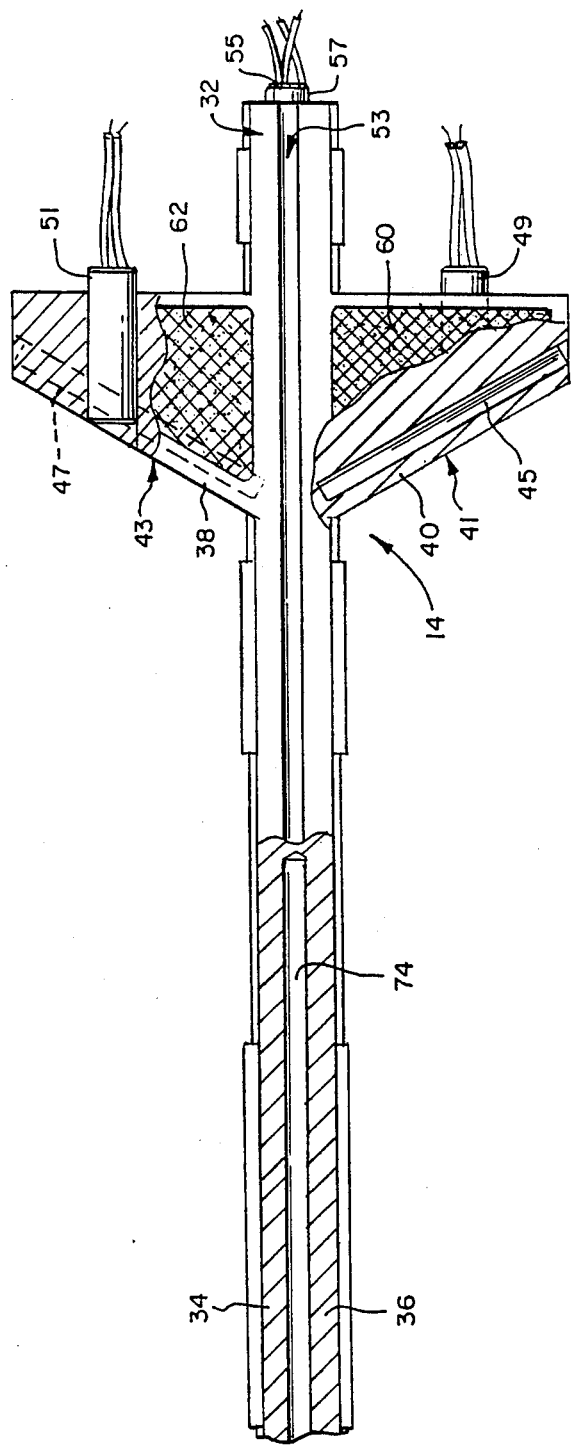
FIG. 4 illustrates a top elevational view of the heating member of the present invention with parts broken away.

Referring now to FIG. 4, the heater member 14 is illustrated. The heater member 14 functions to heat the web of film 15 so that the film is sealed to itself. As illustrated in FIG. 1, the heater member 14 is secured to the first jaw 12 by thermal insulating blocks 17. The thermal insulating blocks 17 are secured to the first jaw 12 by gripper slots (not shown) that clamp the insulating blocks between the jaws. The heater member 14 is then clamped between the thermal insulating blocks 17 and held in place by a threaded screw. The thermal insulating blocks 17 may be constructed from any high temperature thermal insulating material preferably with usage temperature characteristics in excess of 600° F. It has been found that a thermal insulating block constructed from Vespel, by DuPont, functions satisfactorily.

The heating member 14 includes a hot bar 32. The hot bar 32 includes two elongated heater bars 34 and 36 that run the length of the heating member 14. It is the elongated heater bars 34 and 36 that create the side seals 11 in the web of film 15.

The heater memember 14 also includes wing bars 38 and 40 located at acute angles to the heater bars 34 and 36. The wing bars 38 and 40 create the chevron seals 13 in the web of flexible film 15.

As illustrated, the sealing apparatus 10 of the present invention creates the side seals 11 and chevron seals 13 contemporaneously. Accordingly, a separate step is not needed for creating the chevron seals 13.

In order to heat the wing bars 38 and 40, and elongated bars 34 and 36 the heater member 14 includes three separate heating zones. To this end, each of the wing bars 38 and 40 is located on a wing section 41 and 43 of the heater member 14. Each wing section 41 and 43 is a separate heating zone and includes a heater cartridge 49 and 51 respectively. The heater cartridges 49 and 51 provide heat to the wing zones 41 and 43 and accordingly heat the wing bars 38 and 40.

Preferably, the heater cartridges 49 and 51 are custom wound cartridges. Because they are custom wound to better match the specifics of the applications, the heater cartridges 49 and 51 provide greater control of the temperature. To this end, the heater cartridges 49 and 51 provide two wire temperature control. That is, the element material itself has enough of a coefficient of temperature change resistance to sense temperature change. Accordingly, the heater cartridges 49 and 51 act as thermocouples. Due to the construction of the wing members 41 and 43 it is desirable that the heater cartridges 49 and 51 act as thermocouples because there is no place to locate the thermocouples and get a more accurate reading than where the heater cartridges 49 and 51 are located.

It has been found that a Balco wound cartridge from Heatron Inc. of Kansas City, Mo., functions satisfactorily. Other heater cartridges that are believed to function satisfactorily are available from Fluid Kinetics of Fairfield, Ohio and Watlow of St. Louis, Mo.

To stablize the temperature distribution of the wing bars 38 and 40, each wing section 41 and 43 includes thermal pins 45 and 47 respectively. The thermal pins 45 and 47 are located in apertures in the wing zones 41 and 43. The thermal pins 45 and 47 are hollow sealed tubes that include a wick and liquid. The thermal pins insure uniform heat across the wing bars 38 and 40. To this end, the thermal pins are located directly below the wing bars 38 and 40. It has been found that a thermal pin available from Noren of Menlo Park, Calif., functions satisfactorily for the present invention.

The elongated heater bars 34 and 36 define a central heating zone 53 in the heater member 14. The central heating zone 53 includes a thermocouple 55 and a heater cartridge 57. Although preferably the heater cartridge 57 is an ordinary heater cartridge, it is possible to utilize a two wire temperature control heater cartridge. It is also possible to use a split cartridge, with associated thermocouple, and a thermal pin. A heater cartridge 57 available from Watlow, St. Louis, Mo., and a thermocouple 55 available from Watlow, St. Louis, Mo., have been found to function satisfactorily.

Because of the three heat zones 41, 43 and 53, there is a balanced heat transfer between the zones. Accordingly, there is no heat loss from one zone to the other zone. This is critical because one end of the web of film 15 is filled at the sealing station; this requires that the heater member 14 must deliver more heat in order to create the side seals 11 and chevron seals 13. Moreover, because the web of film 15 is filled at this station, the temperature of the heater member 14 must be accurately controlled. The heater cartridges 49, 51 and 57 are orientated so that the estimated heat transfer, i.e., the heat loss and gain, is equal. The proper location for the heater cartridges 49 and 51 for the wing bars 38 and 40 has been found to be a little offset from the center of the wing sections 41 and 43 towards the outside of the wing section; for the elongated heater bars 34 and 36 the proper location for the heater cartridge 57 has been found to be between the elongated heater bars.

The heating member 14 is constructed from anodized aluminum. The aluminum is anodized for corrosion prevention. It is also possible to utilize other metals such as brass, copper, and steel. Preferably, the heater member 14 is of a one-piece construction. This provides better conductivity and is structurally more sound than two or more pieces.

Preferably, the sealing surfaces of the elongated heater bars 34 and 36 and wing members 38 and 40 are coated with a release coating. Most preferably, the surfaces are coated with a ceramic release coating; an example of such a coating is CERAMIPAK available from A&A Company of South Plainfield, N.J.

The wing sections 41 and 43 also include rubber pads 60 and 62. The rubber pads 60 and 62 are slightly raised from the remaining surface of the heater member 14. Preferably, the rubber pads 60 and 62 are raised approximately 5/1000 of an inch to about 15/1000 of an inch. It has been found that if the rubber pads 60 and 62 are raised by approximately 10/1000 of an inch they will function to squeeze any solution away from the area where the chevron seals 13 are to be created. Preferrably the rubber pads 60 and 62 are constructed from a high temperature, high tear silicon. Preferrably the silicon has a Shore A durometer of 50–70.

The rubber pads 60 and 62 are vulcanized to the wing sections 41 and 43 and ground to size. The rubber pads 60 and 62 are also anchored to the wing sections 41 and 43. There are many different ways to anchor the rubber pads to the wing sections. For example, the wing section can be slotted and the rubber pad anchored therein.

Moreover, the rubber pads 60 and 62 also prevent the area under the chevron seals 13 from being sealed. Accordingly, the chevron seals 13 only have a width equal to the width of the wing bars 38 and 40. This is desirable because typically with a solid seal one gets air bubbles; this is due in part to the fluid to be housed by the film. Furthermore, due to the surface area that must be sealed to get a solid seal, a lot of heat must be added to the film. Indeed, a solid seal typically distorts the film.

The wing bars 38 and 40 extend from the elongated heater bars 34 and 36 at an acute angle. Preferably the angle is approximately 25 to about 35 degrees but can vary depending upon the shape of the chevron desired. The wing bars 38 and 40 have a sufficient length so that they extend past the end of the web of film 15. It has been found that the wing bars 38 and 40 can extend past the web of film 15 by approximately ½ inch without interferring with the fitments which are attached to the web of film 15.

Due to the construction of the wing bars 38 and 40, the film 15 does not have to be in exact alignment with respect to the wing bars 38 and 40 in order for the chevron seals 13 to be effectuated. Moreover, due to the shape of the wing bars 38 and 40, i.e., because they are straight, and in view of the construction of the elongated heater bars 34 and 36, the alignment of the web of film 15 on the heater member 14 does not have to be perfect. All the critical features are registered at one time, accordingly the web of film 15 does not have to be in perfect alignment.

Located opposite the heater member 14 on a second side of the web of film 15 is the back-up member 18. The back-up member 18 is mechanically secured in the second jaw member 16. The back-up member 18 is preferably constructed of stainless steel.

The back-up member 18 functions to urge the web of film 15 against the heater member 14. Accordingly, preferably the whole surface of the back-up member 18 that is in contact with the web of film 15 that is heated by heater member 14 is rubber coated. The rubber coating for the back-up member 18 is constructed from a high temperature and high tear silicon and has a Shore A durometer of 50–70. The rubber coating is also preferably vulcanized and anchored to the steel portion of the back-up member.

To aid in the advancement of the web of film 15 through the sealing station, the jaws 12 and 16 include gripper members 24 and spring loaded gripper bars 64 respectively. The gripper members 24 and spring loaded gripper bars 64 function to clamp the layers of the web of film 15 into intimate contact. This is essential to prevent slippage of the web of film 15 as the sealing apparatus 10 seals the two layers of film together to create the side seals 11 and chevron seals 13.

Figure 5:
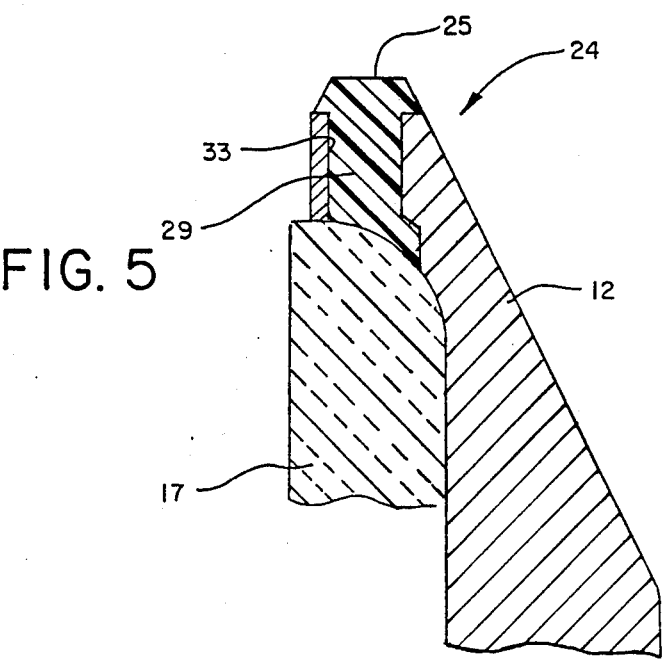
FIG. 5 illustrates a cross-sectional view of the gripper member of the apparatus of FIG. 1.

Referring to FIG. 5, a cross-sectional view of a gripper member 24 is illustrated. The gripper members 24 of the first jaw 12 are preferably constructed from an elastomeric material and include a flat top portion 25 and a body portion 29 respectively. The body portions 29 are secured within anchor holes 33 in the jaws 12. The anchor holes 33 anchor the gripper members 24 to the jaw 12. The gripper members 24 are also vulcanized to the jaw 12. Due to this construction, e.g. because of the flat surfaces 25, anchor holes 33, and vulcanization, the rate of failure for the gripper members 24 is very low. This is in contrast to some prior gripper members for sealing apparatus which cracked or were pulled out of the jaws at relatively frequent intervals.

The second jaw 16 includes the spring loaded gripper bars 64. The spring loaded gripper bars 64 function to grip and advance the web of film 15. Preferably the spring loaded gripper bars 64 are constructed from stainless steel with a concave portion for gripping.

Located within the jaw member 16 may be an actuated knife (not shown). The actuated knife is designed to sever the web of film 15 between the seals 11. To this end, the actuated knife is located within a channel 72 defined in the back-up member 18 and the jaw 16. The knife is actuated by an air cylinder. Preferably the knife has a sweeping motion.

The knife is designed to sever the web of film 15 and be received within a channel 74 defined by the elongated heater bars 34 and 36. An example of an actuated knife that will function satisfactorily is illustrated in U.S. patent application entitled "Replaceable Knife And Holder", Ser. No. 818,166 filed on Jan. 13, 1986, in the name of Josef Schmidt. The disclosure of that application is incoporated herein by reference.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An apparatus for sealing a web of film comprising:
   heating means for melting a portion of the web of film including means for creating side seals in the web of film and means for creating chevron seals in the web of film, the means for creating side seals includes a pair of parallel elongated bars, and the means for creating chevron seals includes a wing bar extending from each of the elongated bars, the heating means including three separate heating zones that are heated by three separate heaters, a first wing bar being heated by a first heater, the elongated bars being heated by a second heater, and a second wing bar being heated by a third heater; and
   means for urging said film against the heating means, said means for urging being located diametric the heating means.

2. The apparatus of claim 1, wherein the wing bar extends from the elongated bar at an acute angle.

3. The apparatus of claim 1 wherein the means for urging includes means for severing the web of film.

4. The apparatus of claim 1 wherein each of said first, second and third heaters includes a heater cartridge for heating a respective heating zone.

5. The apparatus of claim 4 wherein the first and third heating zones include thermal pins located under the wing bars.

6. An apparatus for sealing a web of film comprising:
   heating means for contemporaneously creating side seals and chevron seals in a web of film located on a first side of the web of film, the heating means including two parallel heater bars, and a wing bar extending from each of the heater bars at an acute angle, a first wing bar being located in a first heating zone, a second wing bar being located in a third heating zone, and the parallel heater bars being located in a second heating zone, each heating zone including separate means for heating the zone and regulating the temperature of the zone; and
   a back-up bar located on a second side of said web of film.

7. The apparatus of claim 6 wherein:
   each wing heater bar is located on a wing member that includes a heater cartridge and thermal pin; and
   the parallel heater bars include a heater cartridge and thermocouple.

8. The apparatus of claim 6 wherein:
   the heating means is secured to a jaw that includes gripper members; and
   the back-up member is secured to a jaw that includes corresponding spring loaded gripper bars.

9. The apparatus of claim 7 wherein each wing member includes raised elastomeric pads.

10. An apparatus for sealing a web of film comprising:
    a first jaw located on a first side of the web of film, the first jaw including gripper members for contacting the surface of the web of film;
    a heater member secured to the first jaw for contemporaneously creating side and chevron seals in the web of film, the heater member including a pair of parallel elongated hot bars, a wing bar extending from each of the elongated hot bars, and three separate heating zones;
    each wing bar being located on a wing section that defines a heating zone, and the elongated hot bars defining a heating zone, each wing section includes a heater cartridge and a thermal pin, and the elongated hot bars including a heater cartridge and a thermocouple;
    a second jaw located on a second side of the web of film, the second jaw including gripper bars for contacting the surface of the web of film; and
    a back-up member secured to the second jaw for urging the web of film against the heater member.

11. The apparatus of claim 10 wherein:
    the heater bar includes wing sections on which the wing bars are positioned; and
    each wing section includes a riased rubber pad.

12. A method for creating a container with chevrons comprising the steps of:
    providing a sealing member having two parallel heater bars and a wing bar extending from each heater bar;
    providing three separate heating means, a first heating means heating a first wing bar, a second heating means heating the heater bars, and a third heating means heating a second wing bar;
    separately heating with the heating means the heater bars, the first wing bar and the second wing bar; and
    contemporaneously creating a side seal and chevron seal in a web of film with the sealing member.

* * * * *